United States Patent [19]

Whiteman et al.

[11] 4,242,032
[45] Dec. 30, 1980

[54] RAMP AND RAMP CARRIER FOR TRUCKS AND THE LIKE

[75] Inventors: Paul L. Whiteman, Morgantown; Vernon E. Orr, Elverson, both of Pa.

[73] Assignee: Morgan Trailer Manufacturing Co., Inc., Morgantown, Pa.

[21] Appl. No.: 50,702

[22] Filed: Jun. 21, 1979

[51] Int. Cl.³ .............................................. B60P 1/00
[52] U.S. Cl. ...................................... 414/537; 14/71.1
[58] Field of Search ................. 414/537, 538; 14/71.1; 104/94

[56] References Cited

U.S. PATENT DOCUMENTS

| | | | |
|---|---|---|---|
| 2,178,956 | 11/1939 | Dyer | 104/94 X |
| 2,370,427 | 2/1945 | Sherry | 414/537 |
| 3,511,393 | 5/1970 | Abromavage et al. | 414/537 |
| 3,768,673 | 10/1973 | Nydam et al. | 414/537 X |
| 3,870,170 | 3/1975 | Noble et al. | 414/537 |
| 3,977,545 | 8/1976 | Lloyd | 414/537 |
| 4,078,678 | 3/1978 | Tordella | 414/537 |
| 4,125,908 | 11/1978 | Vail et al. | 104/94 X |

*Primary Examiner*—Robert W. Saifer
*Attorney, Agent, or Firm*—Zachary T. Wobensmith, II; Zachary T. Wobensmith, III

[57] ABSTRACT

A ramp and ramp carrier for trucks and the like is disclosed in which the truck body is provided with long rails comprising I-beams which carry the cross members and truck floor, the long rails being adapted to be supported by and secured to the spaced parallel truck frame rails in a conventional manner, the ramp being pivotally connected to a carriage which is supported by a trolley movable in a longitudinal track secured to the cross members of the body, the ramp and carriage being normally stored between the long rails of the truck body and being retractable for use with one end of the ramp hooked into the floor end plate and the other end resting on the ground.

9 Claims, 5 Drawing Figures

RAMP AND RAMP CARRIER FOR TRUCKS AND THE LIKE

BACKGROUND OF THE INVENTION

1. Field of the Invention

This invention relates to ramp and ramp carriers for trucks and the like in which the ramp is stored beneath the body of the truck and is accessible at the rear of the truck body for withdrawal for use.

2. Brief Description of the Prior Art

It has heretofore been proposed to employ retractable ramps for trucks. One structure for this purpose utilized the long rails of the truck body as a trackway for a carriage to which the ramp was pivotally connected for tilting. This structure has not proven satisfactory because of the tendency of the rails to receive mud and dirt during travel.

SUMMARY OF THE INVENTION

In accordance with the invention a ramp and ramp carrier is provided for truck bodies in which the ramp is carried for storage between the long rails of the truck body, the ramp being pivotally connected to a ramp carriage which is movably supported by a trolley engaged in a central trackway carried by the cross beams of the truck body.

It is the principal object of the invention to provide an improved ramp and ramp carrier for trucks and the like in which the ramp is carried and normally stored between the long rails of the truck body and independent of the attachment of the long rails to the truck chassis.

It is a further object of the invention to provide an improved ramp and ramp carrier which is normally stored below the truck body but is movably supported for extension for use and for return to storage in a simple but effective manner.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawings forming part hereof in which.

It should, of course, be understood that the description and drawings herein are illustrative merely and that various modifications and changes can be made in the structure disclosed without departing from the spirit of the invention.

Like numerals refer to like parts throughout the several views.

DESCRIPTION OF THE PREFERRED EMBODIMENT

Figure 1:
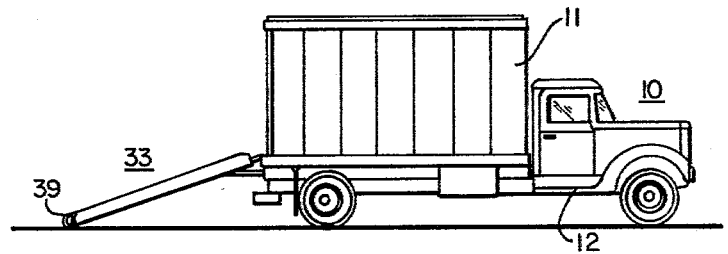
FIG. 1 is a side elevational view of a truck and truck body with the ramp in extended position for use.
Figure 5:
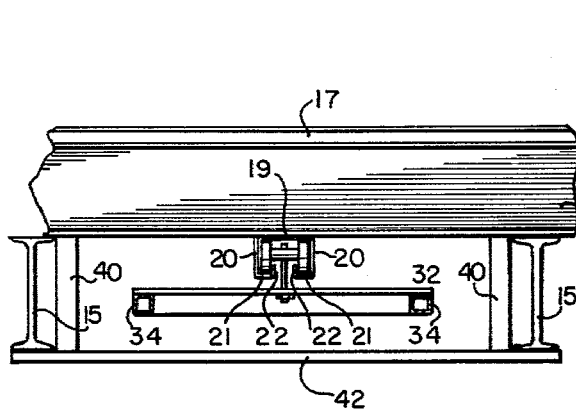
FIG. 5 is a vertical sectional view taken approximately on the line 5—5 of FIG. 4.
Figure 2:
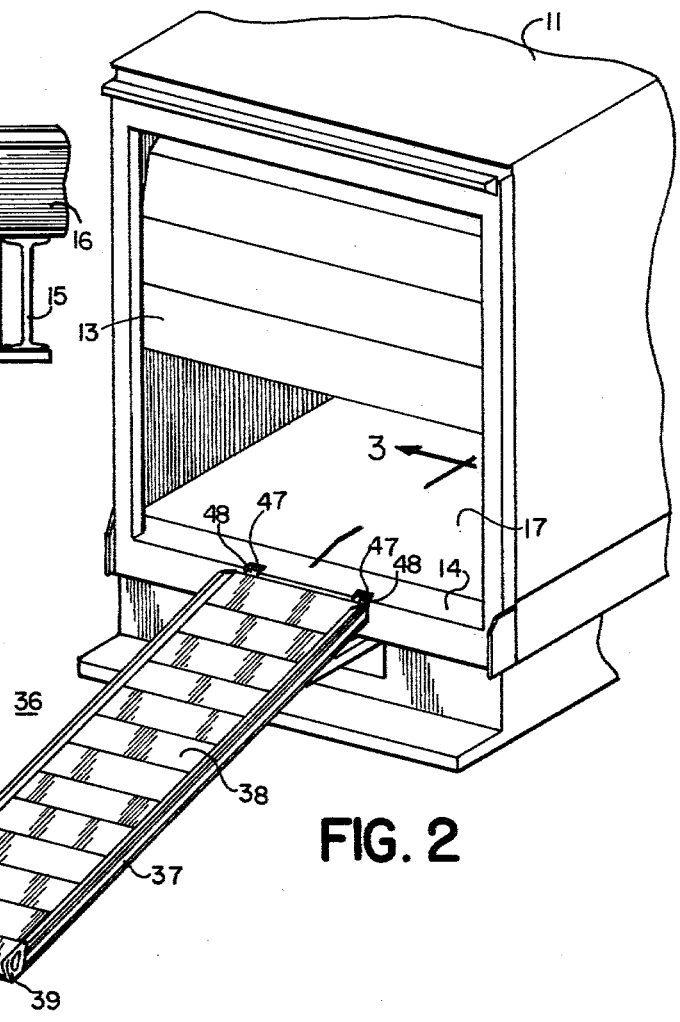
FIG. 2 is a view in perspective showing the rear end of a truck body with a walk ramp in accordance with the invention in extended position for use.
Figure 3:
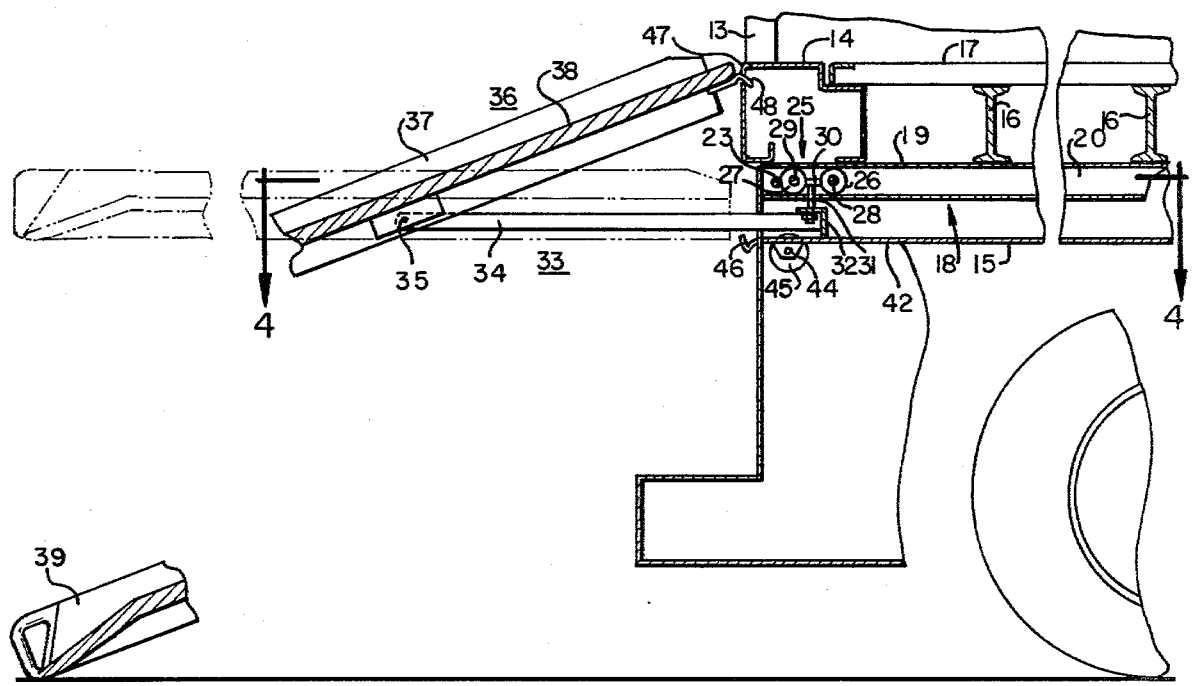
FIG. 3 is a longitudinal sectional view taken approximately on the line 3—3 of FIG. 2.
Figure 4:
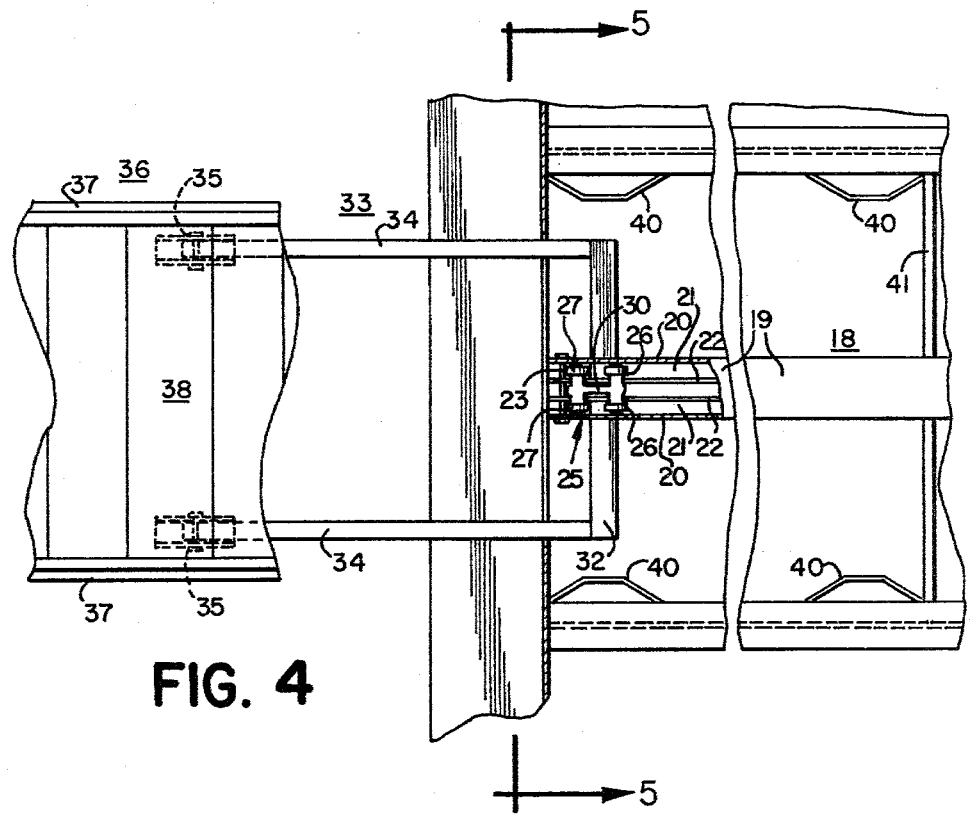
FIG. 4 is a horizontal fragmentary sectional view taken approximately on the line 4—4 of FIG. 3.

Referring now more particularly to the drawings, and first to FIG. 1 a truck 10 is shown having a truck body 11 of any desired type having a chassis 12 to which the truck body 11 is secured in any desired manner. The truck body 11 is shown as having a rear door 13 which engages a rear sill 14 in closed condition. The rear sill 14 is preferably of metal and of box like shape in vertical cross section.

The truck body 11 preferably has spaced parallel long rails 15, preferably I-beams, and the long rails 15 have secured thereto, as by welding, transverse cross members 16, preferably I-beams, to which the truck body floor 17 forwardly of the rear sill 14 is secured in any desired manner.

The cross members 16 and the rear sill 14 preferably have secured to their lower faces and centrally of the body 11 a track 18. The track 18 preferably has a top wall portion 19 secured to the cross members 16 and rear sill 14, spaced downwardly extending parallel side wall portions 20, inwardly extending horizontal bottom wall portions 21 with spaced parallel upwardly extending flanges 22. A horizontal stop pin 23 is provided at the front end of the track 18 for limiting forward motion along the track.

The track 18 is adapted to carry a trolley 25 having forward and rear pairs of wheels 26 and 27 on shafts 28 and 29 with a central trolley frame 30. A support rod 31 extends downwardly from the frame 30 and extends through in pivotal supporting relation to a front frame bar 32 of a ramp carriage 33. The ramp carriage 33 has side frame bars 34 which are connected at their rear ends by hinges 35 to the underside of a walk ramp 36.

The ramp 36 has a ramp body with side frame bars 37 and a ramp floor 38 preferably of planking therebetween and below the upper faces of the frame bars 37. The outer ends of the frame bars 37 are preferably provided with handles 39 to facilitate moving the ramp 37. The rails 15 preferably carry forward and rear positioning spacers 40 to position the ramp 36 and prevent sidewise or shifting movement. A front stop bar 41 limits forward movement of the ramp 36.

At the outer end of the long rails 15 and therebelow a transverse horizontal plate 42 is welded to an available part of the chassis 12 to provide a space for insertion and withdrawal of the ramp 36 and ramp carriage 33. The plate 42, spaced inwardly with respect to the rails 15 and at locations for engagement by the side frame bars 37 of the walk ramp 36 has roller brackets 44 which carry pivotally mounted rollers 45 for aiding inward and outward movement of the ramp 36.

The plate 42 carries a releasable catch 46 normally urged upwardly by a spring (not shown) to engage the outermost edge of the ramp floor 38 to retain the ramp 36 in stored position.

The rear sill 14 can have spaced notches 47 for engagement by hooks 48 carried on the bottom of the ramp floor 38 when the ramp 36 is in its outward or extended position for use.

The mode of use will now be pointed out.

The ramp 36 is normally stored in a horizontal position beneath the floor 17 and cross members 16 with the trolley 25 in the track 18 at its forwardmost position, and with the catch 46 engaged with the edge of the floor 38 of the ramp 36.

When it is desired to use the ramp 36, the catch 46 is released and the ramp 36 is moved rearwardly. The trolley 25 engaged in the track 18 is moved rearwardly with the ramp 36 until the ramp carriage 33 is in a position where the rear end of the ramp 36 can be swung downwardly at the hinges 35 and placed on the ground. The hooks 48 are engaged in the notches 47 in the rear sill 14 and the ramp 36 is ready for use.

The ramp 36 can be returned to its storage by a reversal of the operations just described.

We claim:

1. A ramp and ramp carrier for trucks and the like having a truck frame and a truck body thereon comprising spaced longitudinally extending body frame rails,
    transverse cross members carried on the upper extremities of said body frame rails,
    a fixedly mounted track member centrally disposed between said body frame rails,
    a trolley member movable along said track member,
    a ramp carriage member movable between said body frame rails at its front end and carried by said trolley member and having rearwardly extending frame portions, and
    a walk ramp movable between said body frame rails to positions for storage and for use and to which said rearwardly extending frame portions are hingedly connected intermediate the ends of the walk ramp.

2. The combination defined in claim 1 in which said track member is secured to said cross members.

3. The combination defined in claim 1 in which
    said track member has a top wall portion, downwardly extending side wall portions, and spaced horizontal bottom wall portions,
    said trolley member has a frame and wheels carried by said frame within said track member, and
    a support is provided between said frame and said ramp carriage member.

4. The combination defined in claim 3 in which
    said track member has spaced upwardly extending flanges along the contiguous edges of said bottom wall portions.

5. The combination defined in claim 3 in which
    said trolley member has spaced forward and rear pairs of wheels on said frame and engaging said horizontal bottom wall portion of said track member.

6. The combination defined in claim 3 in which
    said trolley member is pivotally connected to said ramp carriage member.

7. The combination defined in claim 1 in which
    said walk ramp has hooked portions for engagement with a portion of said truck body in tilted and extended position.

8. The combination defined in claim 1 in which
    said track member has a top portion for limiting movement of said trolley member in one direction.

9. The combination defined in claim 1 in which
    said body frame rails have a stop member for limiting movement of said ramp carriage in one direction.

* * * * *

UNITED STATES PATENT AND TRADEMARK OFFICE
CERTIFICATE OF CORRECTION

PATENT NO. : 4,242,032
DATED : December 30, 1980
INVENTOR(S) : Paul L. Whiteman and Vernon E. Orr It is certified that error appears in the above—identified patent and that said Letters Patent is hereby corrected as shown below:

Column 4,

Line 26, after "a" change "top" to - stop -

*Signed and Sealed this*

*Thirty-first* Day of *March 1981*

[SEAL]

*Attest:*

RENE D. TEGTMEYER

*Attesting Officer*     *Acting Commissioner of Patents and Trademarks*